(12) United States Patent
McPheeters et al.

(10) Patent No.: US 11,841,169 B2
(45) Date of Patent: Dec. 12, 2023

(54) TRACKER MOTOR SUPPORT FOR TRUSS FOUNDATIONS

(71) Applicant: Ojjo, Inc., San Rafael, CA (US)

(72) Inventors: Greg McPheeters, Santa Cruz, CA (US); Charles Almy, Berkeley, CA (US); Cormac McHugh, Eureka, CA (US)

(73) Assignee: Ojo, Inc., San Rafael, CA (US)

( * ) Notice: Subject to any disclaimer, the term of this patent is extended or adjusted under 35 U.S.C. 154(b) by 103 days.

(21) Appl. No.: 17/478,780

(22) Filed: Sep. 17, 2021

(65) Prior Publication Data
US 2022/0082303 A1 Mar. 17, 2022

Related U.S. Application Data

(60) Provisional application No. 63/079,918, filed on Sep. 17, 2020.

(51) Int. Cl.
*F24S 25/13* (2018.01)
*F24S 25/16* (2018.01)
*F24S 30/00* (2018.01)
*F24S 25/632* (2018.01)

(52) U.S. Cl.
CPC ............. *F24S 25/13* (2018.05); *F24S 25/16* (2018.05); *F24S 25/632* (2018.05); *F24S 30/00* (2018.05); *F24S 2030/11* (2018.05)

(58) Field of Classification Search
CPC .......... F24S 25/13; F24S 25/16; F24S 25/632; F24S 30/00; F24S 2030/11; F24S 2025/6009; F24S 25/12; F24S 25/617; F24S 25/65; F24S 2025/014; F24S 30/425; H02S 20/32; Y02E 10/47; Y02E 10/50

See application file for complete search history.

(56) References Cited

U.S. PATENT DOCUMENTS

| | | | | |
|---|---|---|---|---|
| 4,387,702 A * | 6/1983 | Murphy | ................... | F24S 50/20 353/3 |
| 5,199,677 A * | 4/1993 | Sessions | ................ | A01G 17/14 248/351 |
| 5,907,128 A * | 5/1999 | Lanan | ...................... | H02G 1/14 174/76 |
| 6,299,125 B1 * | 10/2001 | Zayeratabat | ........... | A01G 29/00 47/42 |
| 6,347,489 B1 * | 2/2002 | Marshall, Jr | ............ | E02D 27/00 52/126.6 |
| 8,561,361 B2 * | 10/2013 | Bauletti | ............... | E04H 12/2215 52/158 |
| 9,850,638 B2 * | 12/2017 | Despotellis | ............. | E02D 27/42 |
| 10,030,347 B2 * | 7/2018 | Kemp | ..................... | E04H 12/20 |
| 2010/0282943 A1 * | 11/2010 | Boyk | .................... | F24S 30/455 248/550 |

(Continued)

*Primary Examiner* — Ko H Chan
(74) *Attorney, Agent, or Firm* — Phillip D. Mancini

(57) ABSTRACT

A truss foundation for supporting single-axis solar tracker drive motors and center structures. An adapter joins a pair of adjacent truss legs and provides a mounting platform to support a drive motor and/or center structure of a solar tracker. The adapter has a pair of connecting portions that are received in the legs of the truss foundation. The adapter may be a unitary structure or consist of a pair of slidably connected members that are joined with fasteners to accommodate truss legs spaced apart at different distances.

12 Claims, 15 Drawing Sheets

(56) References Cited

U.S. PATENT DOCUMENTS

| | | | |
|---|---|---|---|
| 2011/0163051 A1* | 7/2011 | Horanek | F24S 25/13 211/26 |
| 2012/0180780 A1* | 7/2012 | Tseng | F24S 30/458 126/606 |
| 2016/0010775 A1* | 1/2016 | Morroney | F16L 27/08 285/133.11 |

* cited by examiner

PRIOR ART

TRACKER MOTOR SUPPORT FOR TRUSS FOUNDATIONS

CROSS-REFERENCE TO RELATED APPLICATIONS

This claims priority to U.S. provisional patent application No. 63/079,918 filed on Sep. 17, 2020, titled "TRACKER MOTOR SUPPORT FOR TRUSS FOUNDATIONS AND REATED SYSTEMS", the disclosure of which is hereby incorporated by reference in its entirety.

BACKGROUND

Truss foundations have the potential to save steel and labor relative to conventional H-pile foundations when used to support single-axis trackers. The primary benefit H-piles offer is simplicity and universal adaptability. Where that value proposition erodes is when there is subsurface obstruction requiring expensive and time-consuming mitigation steps, when steel prices rise, and when environmental concerns make wasting steel and using concrete and other energy-intensive materials untenable. Although there are multiple suppliers of single-axis trackers in the market place, nearly all have adapted their products to sit atop of H-piles. When larger forces must be resisted, such as, for example, at locations where torque tube motors are located, the beams are upsized, and if necessary driven to deeper depths. This brute force single-member approach works but it is not optimized from a material usage or labor-saving potential.

Truss foundations form a truss with the ground, converting lateral wind loads into axial forces of tension and compression in the truss legs whereas H-piles resist such forces by resisting bending moments, requiring them to made from heavier materials and driven to deeper depths. Because single structural members are relatively good at resisting axial forces compared to their ability to resist bending, much smaller members may be used to construct a truss foundation relative to H-piles. However, because truss foundations consist of multiple components and must be assembled, it is critical to keep the part count low and the installation procedures common for components with different load profiles across the array.

For example, foundations that support torque tube drive motors, in particular with an inter-row motor assembly where a single motor is connected to output drive shafts extending across multiple rows of the array such as in the DuraTrack HZ tracker from Array Technologies, Inc. of Albuquerque, N. Mex. (hereinafter "ATI"), may experience significant moments at the motor locations because the motor resists unintended rotation of the torque tube. Therefore, when supporting the motor or inter-row drive components, it may be necessary to use a sturdier or more complicated truss foundation than that used to support one of the torque tube bearings, which typically resist little or no bending moments. To that end, FIGS. 1A and 1B show one possible configuration of a truss foundation 100 for supporting ATI's motor assembly 50. The basic truss foundation includes a pair of adjacent truss legs, each consisting of screw anchor 10 and upper leg 15 sleeved over driving coupler 12. The upper end of each upper leg section is joined with truss cap 110. Truss cap 110 provides a platform to support the torque tube bearing assembly.

With continued reference to FIGS. 1A and 1B, foundation 100 consists of a pair of trusses or so-called double trusses each consisting of screw anchors 10, upper leg sections 15, and couplers 12 joined above ground with truss cap 110. Cradles 115 are extended orthogonally from each truss cap 110 and motor assembly 50 rests on and is attached to cradles 115. In the case of the ATI tracker, a single motor is used to control multiple rows of the tracker by extending a drive shaft from motor assembly 50 to a so-called center structure in the adjacent row. Additional drive shafts and universal joints extend from that center structure to the next across and this continues across each interlinked row of the array.

While this double-truss foundation 100 may be effective at resisting the moments experienced at the tracker drive motor or interlinked center structures, it requires twice as much hardware (i.e., two trusses plus cradles) and a different installation workflow than the other foundations in the row. To mitigate this problem, various embodiments of this disclosure provide truss foundations, motor support truss caps, and other related structures and systems for supporting a torque tube drive assembly such as the ATI drive motor assembly with a single truss foundation.

DETAILED DESCRIPTION

The following description is intended to convey a thorough understanding of the embodiments described by providing a number of specific embodiments and details involving truss foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
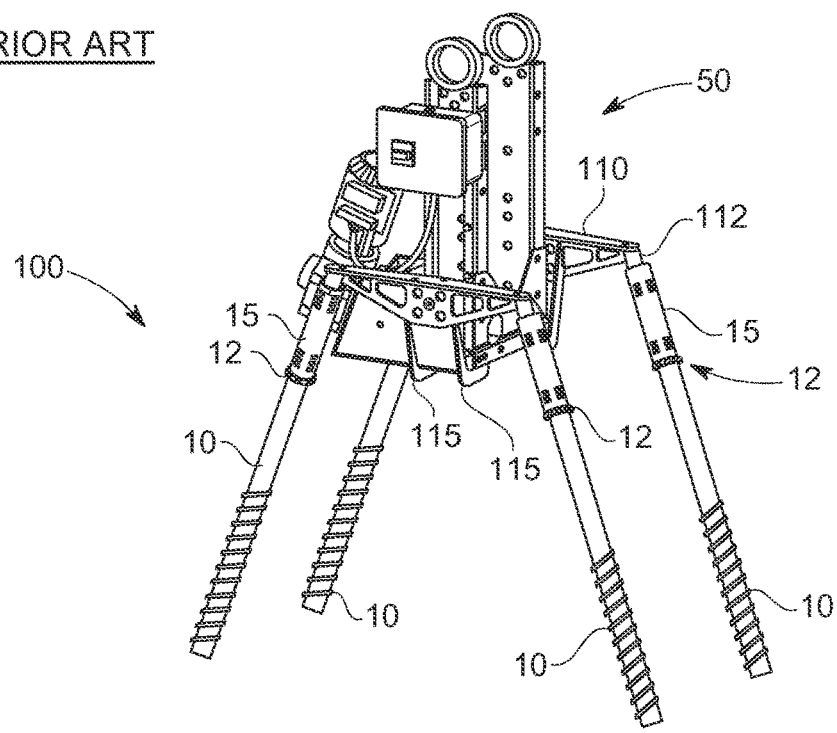
FIG. 1A shows a truss foundation supporting a single-axis tracker motor in accordance with various embodiments of the disclosure.
Figure 1B:
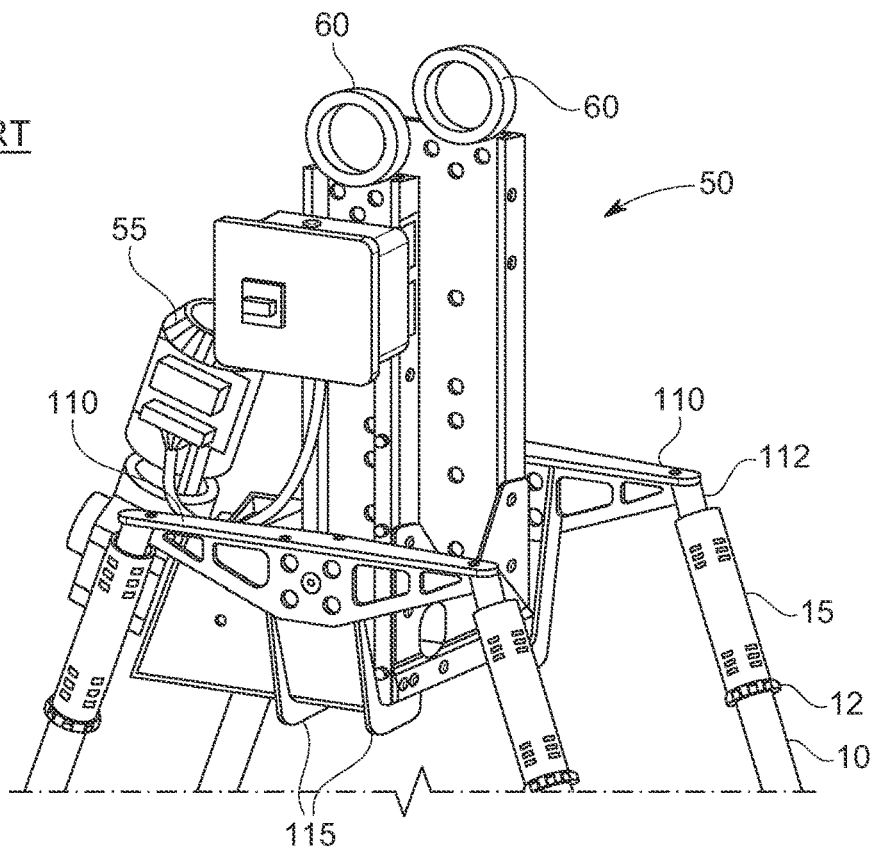
FIG. 1B is a close up of the portion of the truss foundation of FIG. 1A supporting the single-axis tracker motor.

As discussed above, from a work flow and material usage perspective, it is preferable that truss foundations supporting the torque tube motor, center structure, or other equipment that may translate bending moments into the foundation, be constructed of from substantially the same materials and with substantially the same work flows as the other bearing truss foundations in each row to the maximum extent possible. While double trusses 100 shown in FIGS. 1A and 1B will provide adequate resistance to the forces experienced at the ATI drive motor, they require two sets of trusses be constructed in close proximity to one another with unique truss caps and special cradle hardware interconnecting them. To avoid that, the applicant of this disclosure has developed a motor support truss cap that joins a single pair of truss legs, driven with a wider stance than other trusses in the row to form a truss foundation capable of supporting ATI's torque tube drive motor, center structure assembly, or other heavy loads in the tracker array. One of example of this is seen in FIGS. 2A-2F.

Motor support truss cap 120 shown in FIGS. 2A-2F is bow-shaped structure having an elongated main body portion 122 with a central bridge portion 123 and a pair of connecting portions 126 at each opposing distal end that project away from the main body 122. Motor support truss cap 120 shown in these figures is a one-piece or unitary structure, although it should be appreciated that it may formed from two halves that joined together to form a unitary structure, such as in the embodiment shown in FIGS. 9A/B, 10, and 11.

Figure 8:
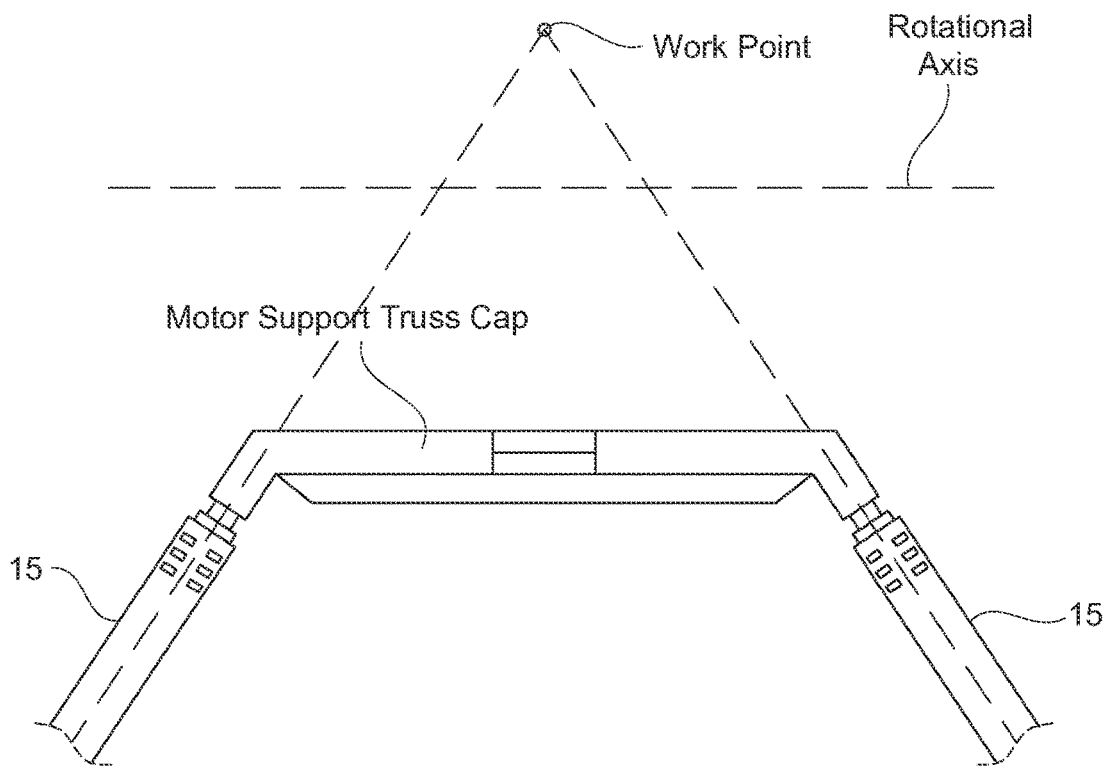
FIG. 8 is a diagram showing the location of the work point of a truss foundation supporting a tracker motor relative to the tracker's rotational axis according to various embodiments of the disclosure.

Central bridge portion 123 includes a pair of opposing motor mount sections 124 with slots 125 for that provide a base that is sufficiently wide to support the drive motor while the entire structure is connected to the ground via only two truss legs. Connecting portions 126 are located at opposing ends of each main body portion 122. Connecting portions 126 include crimp connectors 127 received in the upper end of respective upper legs 15. Crimp connectors 127 are angled projections with a circular cross section that point down and away from main body 122 of motor support truss cap 120. Adjacent grooves, in this example three (3), circumscribe crimp connectors 127. When the crimp connector 127 is received in hollow upper leg section such as section 15 in FIG. 2E, a crimping device may be placed over the upper leg, deforming the metal into these grooves to provide a secure, fastener-free connection. As seen in FIG. 8, when these connections are made, an axis through the center of each connector (connecting portion), as well as the respective truss legs, points at a common work point of the truss that is located above what will be the rotational axis of the tracker. As discussed in commonly assigned U.S. Pat. No. 10,903,784, hereby incorporated by reference in its entirety, when lateral load dominate, there is an advantage to constructing a truss foundation so that the rotational axis of the array, in the case of the ATI Tracker, the center of the torque tube, is aligned with the work point of the truss, that is the imaginary intersection point of a line through the center of each leg. This insures that the lateral load is maximally translated into axial forces of tension and compression in the truss legs. By contrast, when bending moments dominate there is an advantage to constructing the truss foundation so that the rotational axis is oriented below the truss work point to reduce the magnitude of that moment.

Figure 2A:
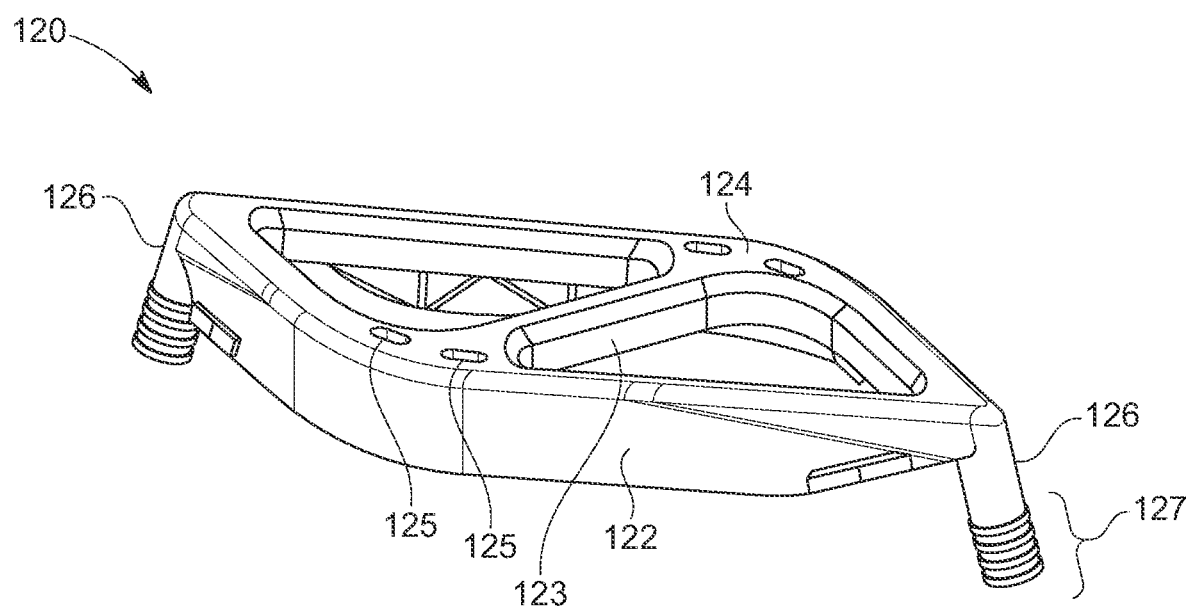
FIG. 2A is an upper perspective view of a tracker motor support for a truss foundation according to various embodiments of the disclosure.
Figure 2B:
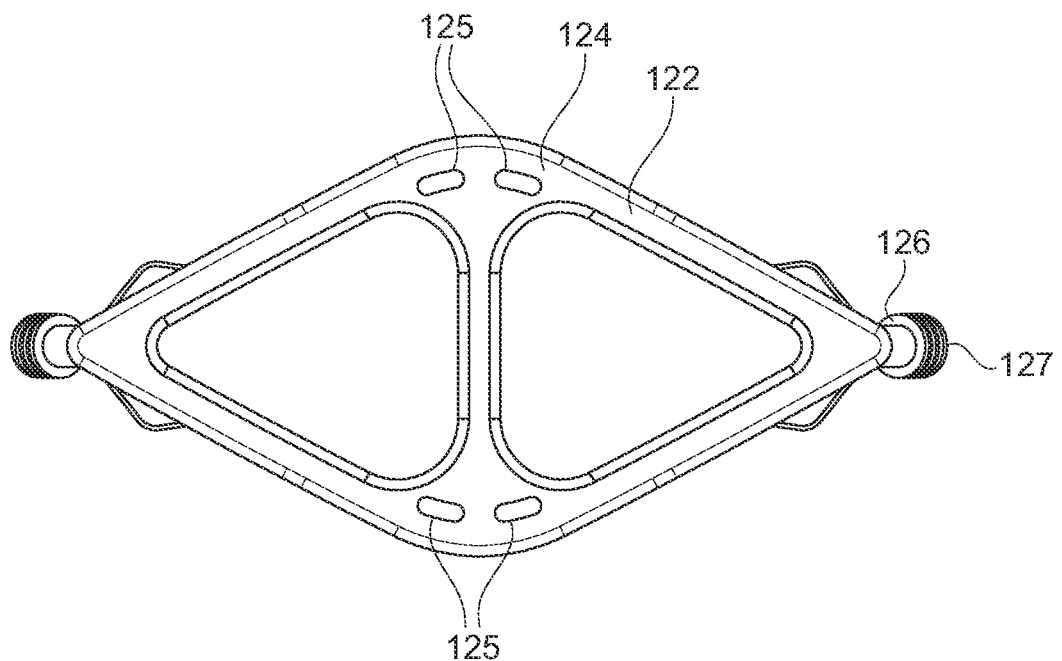
FIG. 2B is a top view of the tracker motor support of FIG. 2A.
Figure 2C:
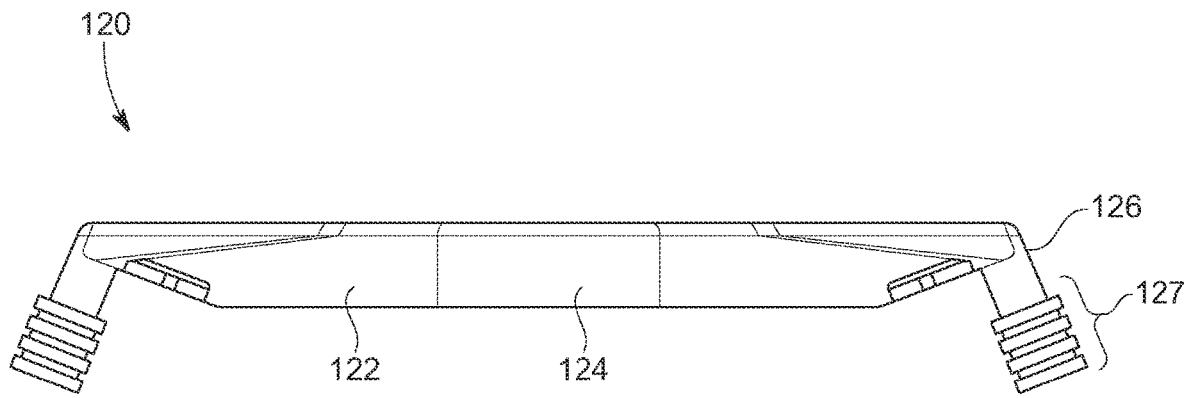
FIG. 2C is a front view of the tracker motor support of FIG. 2A.
Figure 2D:
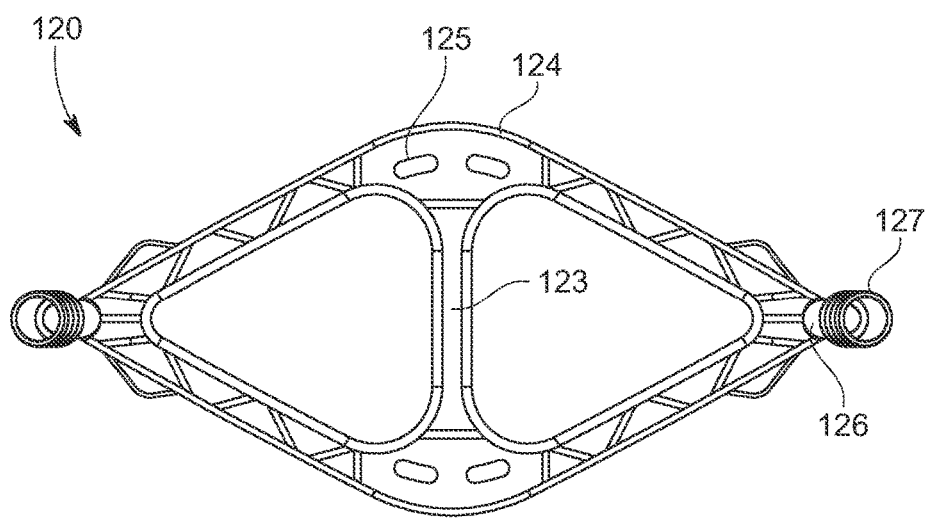
FIG. 2D is a bottom view of the tracker motor support of FIG. 2A.
Figure 2E:
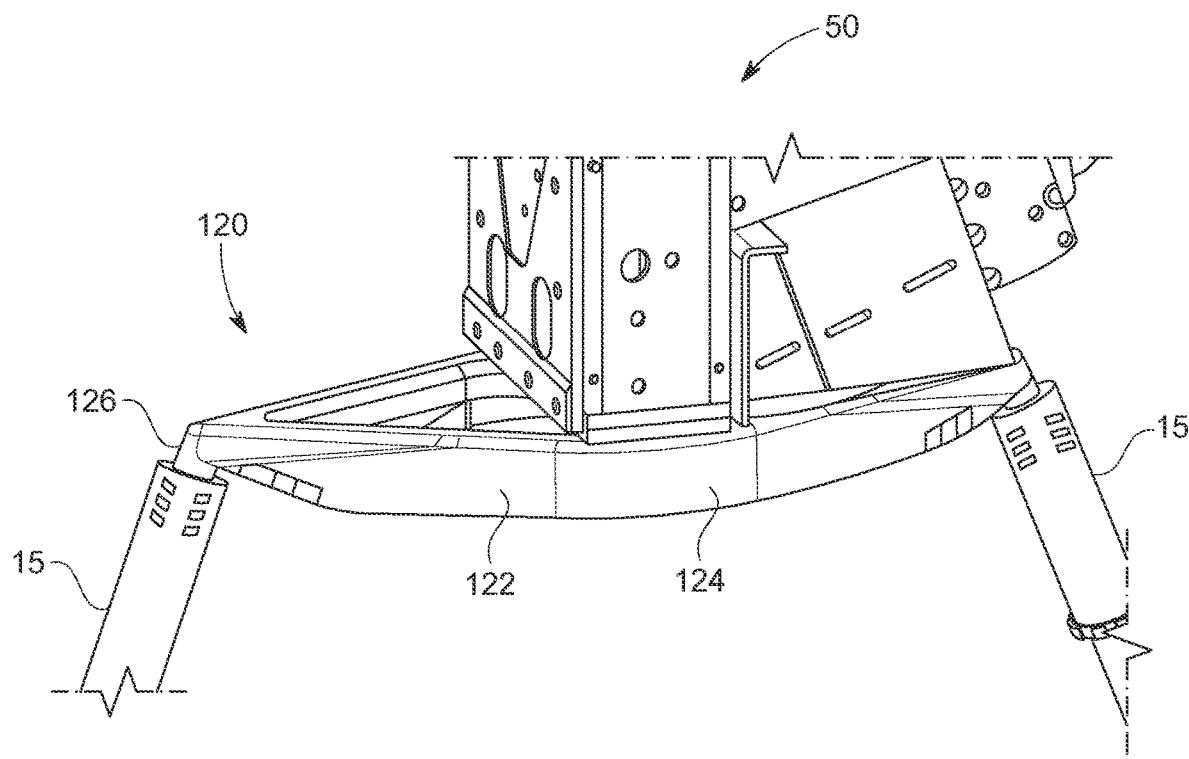
FIG. 2E is an upper perspective view of the tracker motor support of FIG. 2A supporting a tracker motor.
Figure 2F:
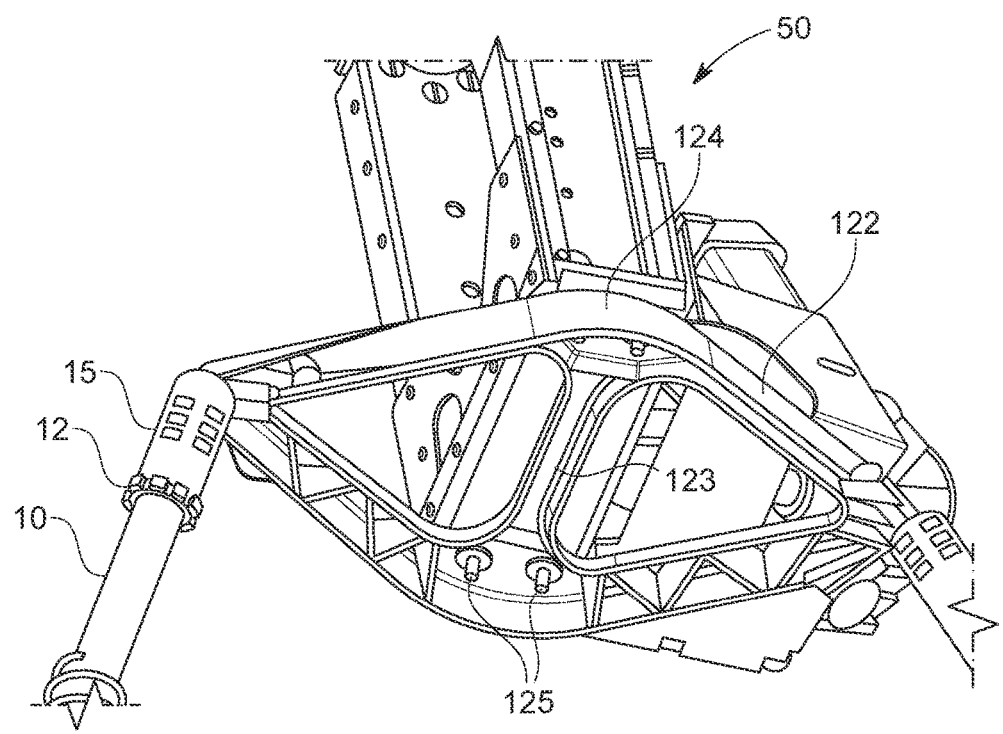
FIG. 2F is a lower perspective view of the tracker motor support of FIG. 2A supporting a tracker motor.

Installation of a truss foundation using motor support truss cap 120 is accomplished in the same fashion as conventional bearing trusses is effected by driving a pair of adjacent screw anchors into the ground proximate to the intended location of the motor or center structure to be supported and at the appropriate leg angle. Then, the motor support truss cap is preferably held in place by a jig or other device on the mast of the installation machine at the height and orientation that will put the torque tube supports 60 of the ATI motor assembly 50 bearings at the correct position in Y (East-West), and Z (elevation). While motor support truss cap 120 is held in place, upper leg sections 15 are sleeved over crimp connectors 127 of connecting portions 126 and then down onto driving coupler 12 of each driven screw anchor. A crimping device is used to effect the connections between upper leg section 15 and their respective screw anchors 10 and the motor support truss cap's connecting portions 126. When done, motor support truss cap 120 will be at the right height and orientation so that when ATI motor assembly 50 is attached to motor mount portions 124 of central bridge portion 123, torque tube supports 60 will be correctly oriented with respect to other torque tube bearing in that row. FIGS. 2E and 2F are side and bottom views respectively of motor support truss cap 120 when it is attached to a pair of truss legs and supporting an ATI torque tube drive motor assembly. A pair bolts or other fasteners may be driven from below, through slots 125 and up into motor assembly 50 to secure it to the foundation.

Figure 3A:
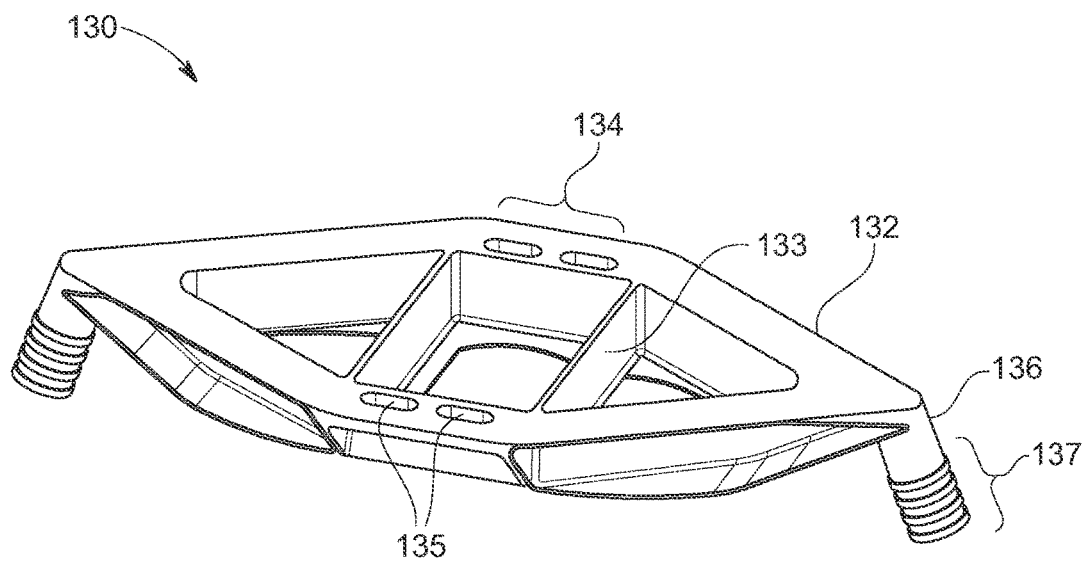
FIG. 3A is an upper perspective view of a tracker motor support according to various other embodiments of the disclosure.
Figure 3B:
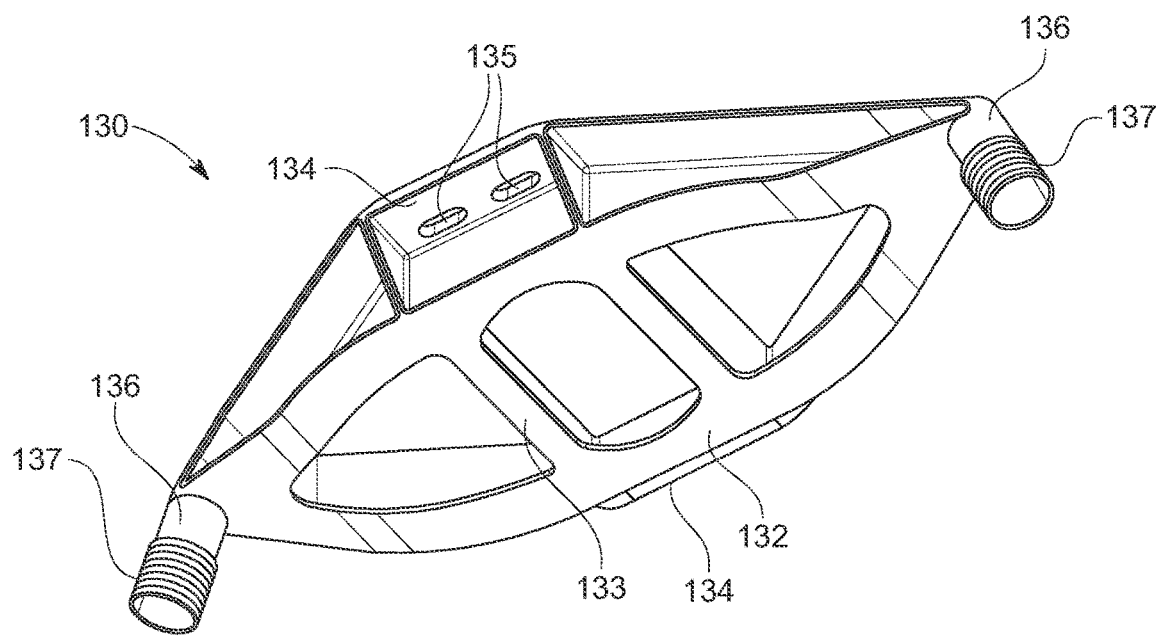
FIG. 3B is a lower perspective view of the tracker motor support of FIG. 3A.

FIGS. 3A and 3B show another motor support truss cap 130 according to various other embodiments of the disclosure. Truss cap 130 includes reinforcement flanges 133 along main body 132 at central bridge portion 133 but is otherwise very similar to truss cap 120.

Figure 4A:
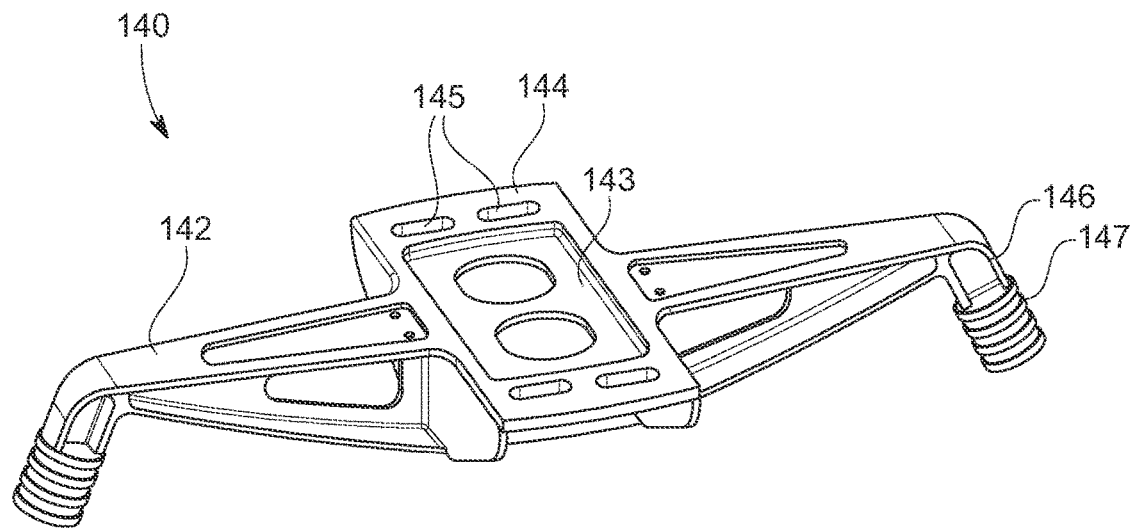
FIG. 4A is an upper perspective view of a tracker motor support according to various additional embodiments of the disclosure.
Figure 4B:
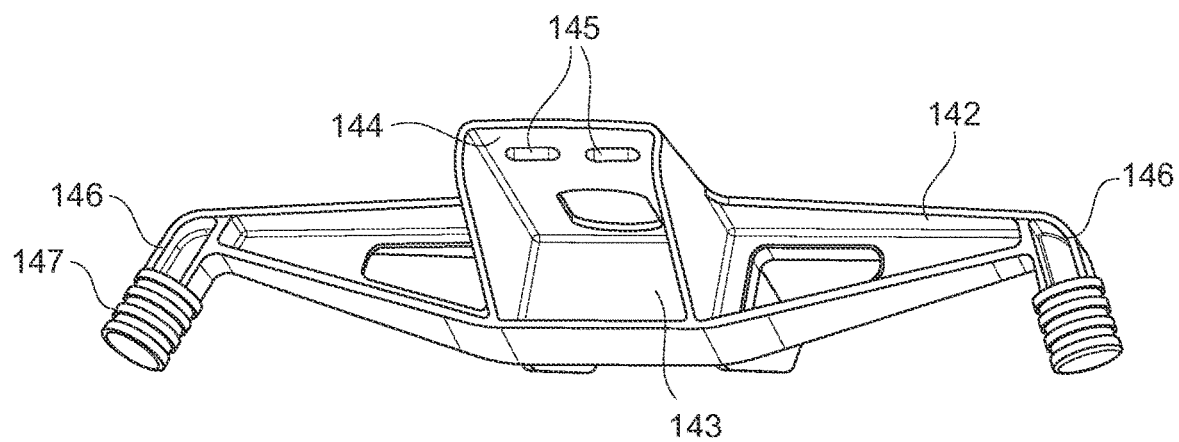
FIG. 4B is a lower perspective view of the tracker motor support of FIG. 4A.
Figure 4C:
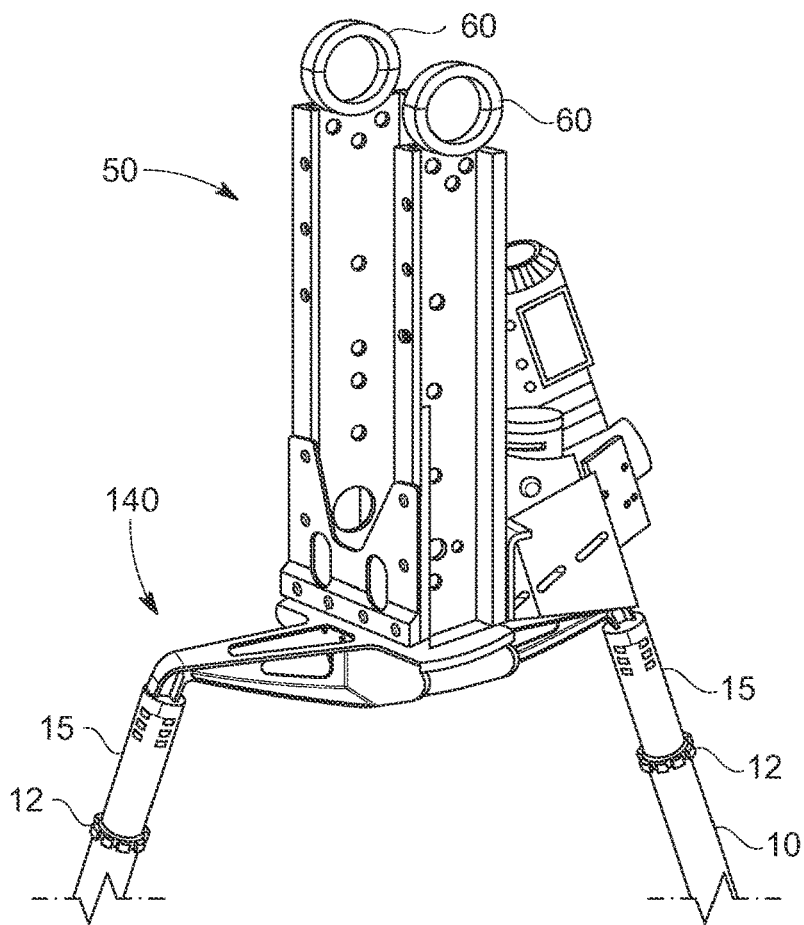
FIG. 4C shows a tracker motor component supported by a truss foundation including the tracker motor support of 4A.

Turning to FIGS. 4A-4C, these figures show different views of another motor support truss cap 140. Unlike motor support truss cap 120, 130 shown in FIG. 2A-F or 3A/B, in this one, truss cap 140 has narrower main body 142 on either side of central bridge portion 143. Main body 142 is reinforced from below and bisected central bridge portion 143. A pair of structurally reinforced motor supports sit at opposing ends of the bridge portion with slots 145 to provide support below the full width of the ATI motor assembly, as seen, for example, in FIG. 4C. This casting may provide the advantage of using less steel by weight than larger versions of the motor support truss cap of other embodiments. As seen in 4C, ATI motor assembly 50 includes bearings 60 that extend upwards from the support to the intended elevation of the torque tube (e.g., the rotational axis). This enables the motor to impart torque to a gear which in turn rotates the torque tube in dual bearings 60. Though not shown in the figure, in the ATI motor assembly, an output drive shaft extends from the motor assembly to a so-called center structures in the adjacent row, and from that center structure to the next adjacent center structure and so-on and so-forth across the array. Each subsequent center structure has an output shaft extending to the next adjacent one, enabling torque to be transferred across rows. Universal joints are used to take up differences in elevation and angle from row to row.

Figure 5A:
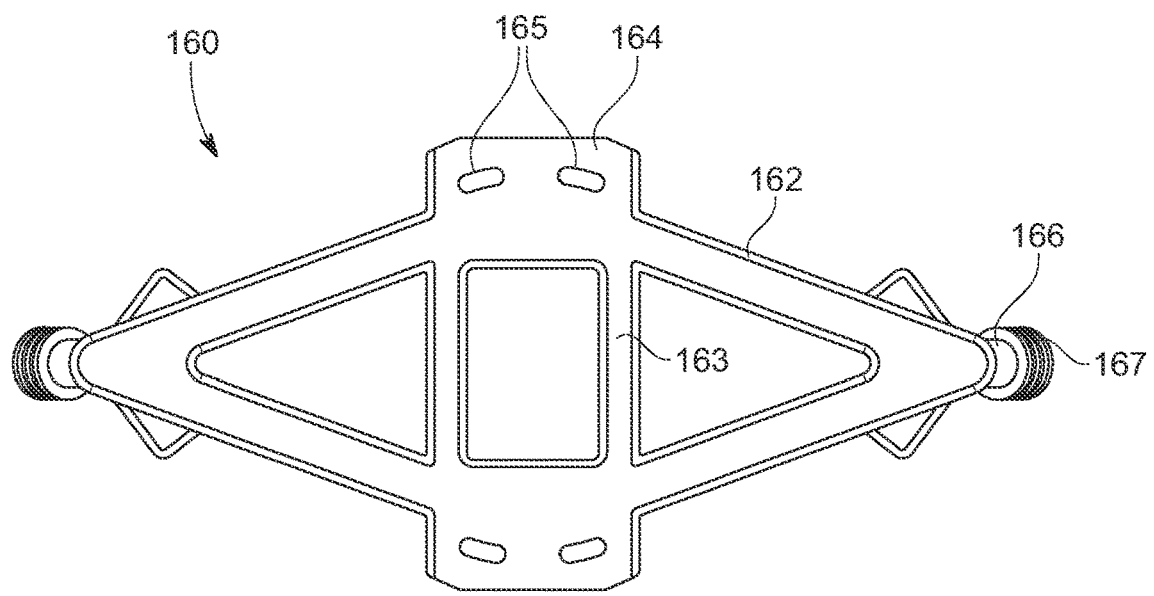
FIG. 5A is a top view of a tracker motor support according to further embodiments of the disclosure.
Figure 5B:
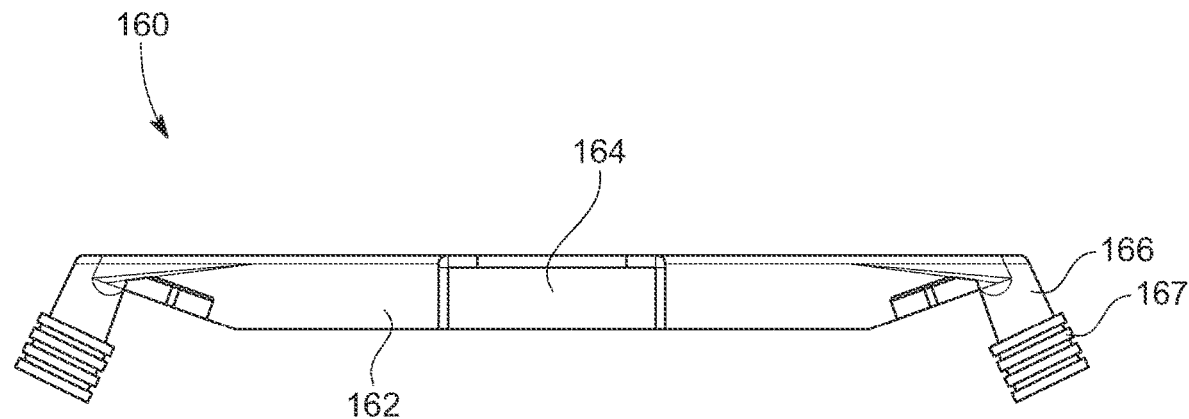
FIG. 5B is a side view of the tracker motor support of FIG. 5A.
Figure 5C:
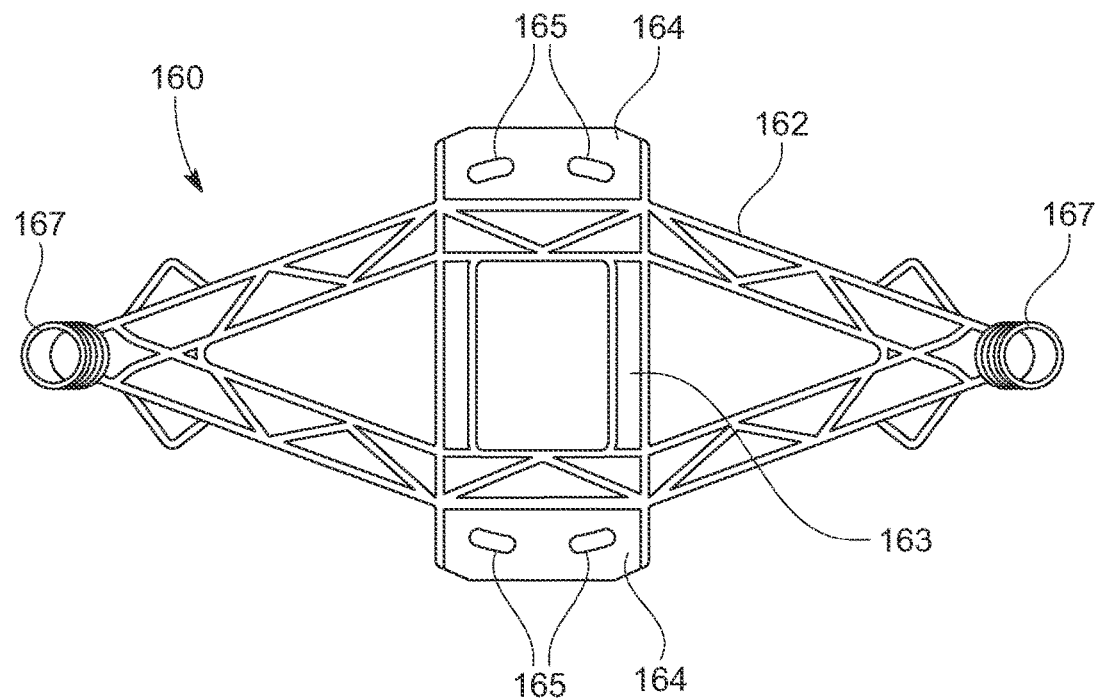
FIG. 5C is lower view of the tracker motor support of FIG. 5A.
Figure 5D:
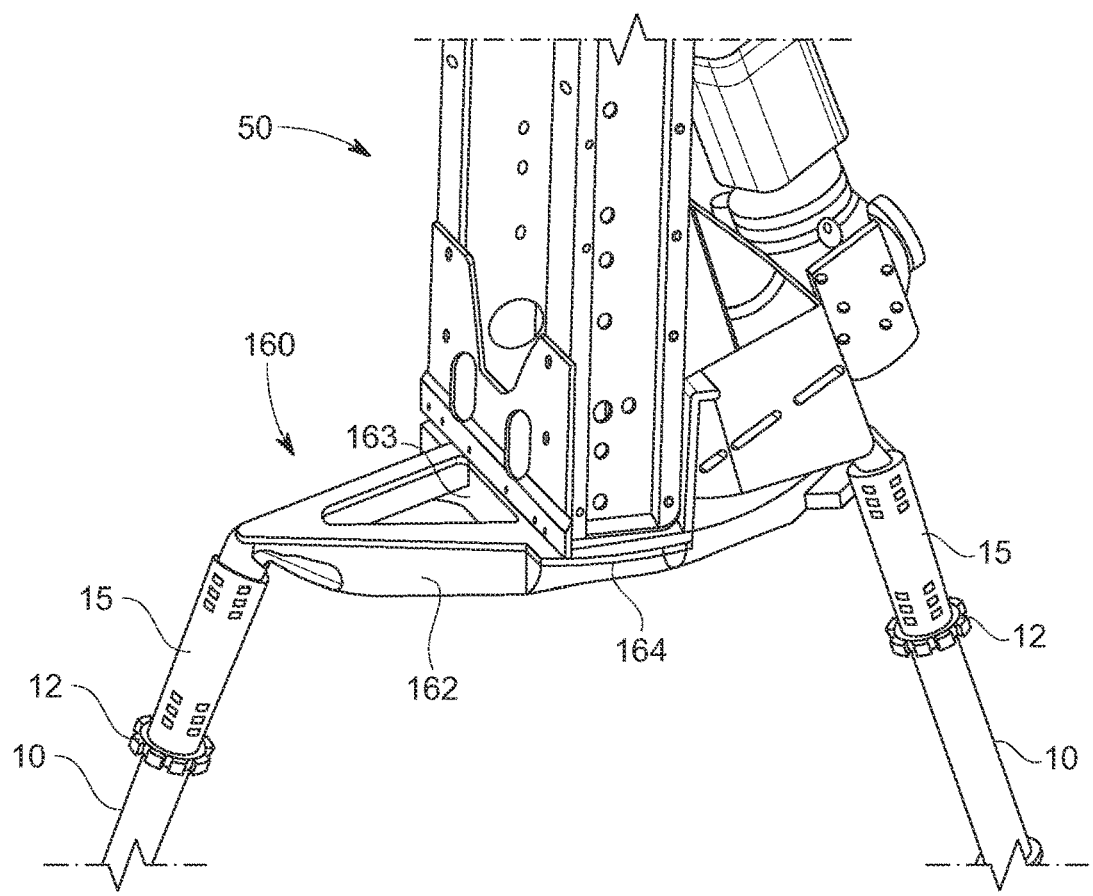
FIG. 5D shows a tracker motor component supported by a truss foundation including the tracker motor support of 5A.
Figure 5E:
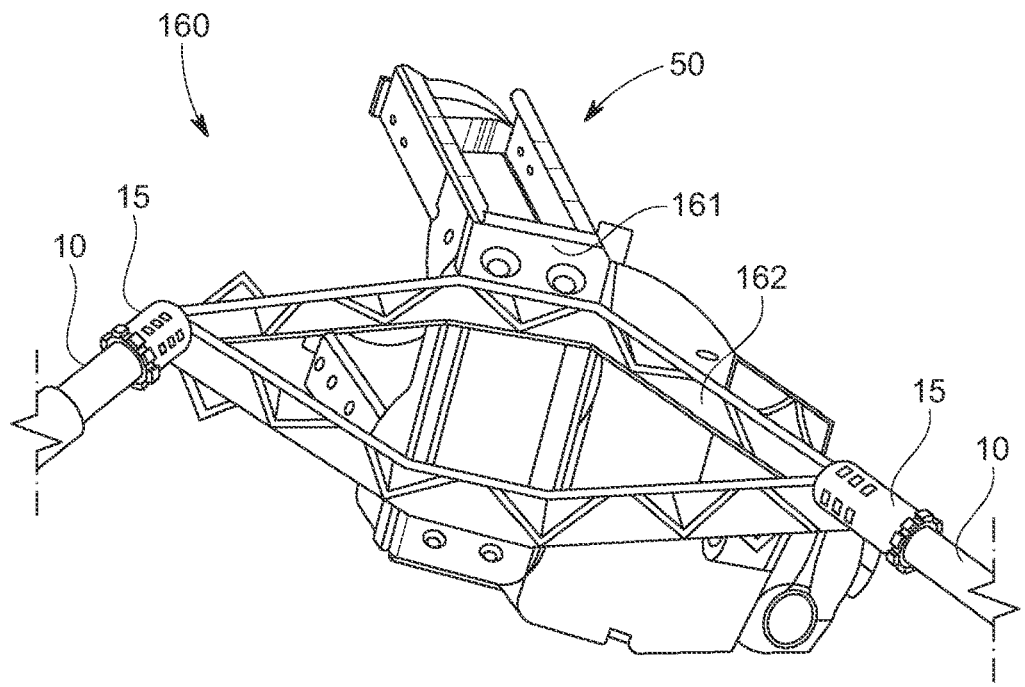
FIG. 5E shows a tracker motor component supported by a truss foundation including the tracker motor support of 5A.
Figure 6A:
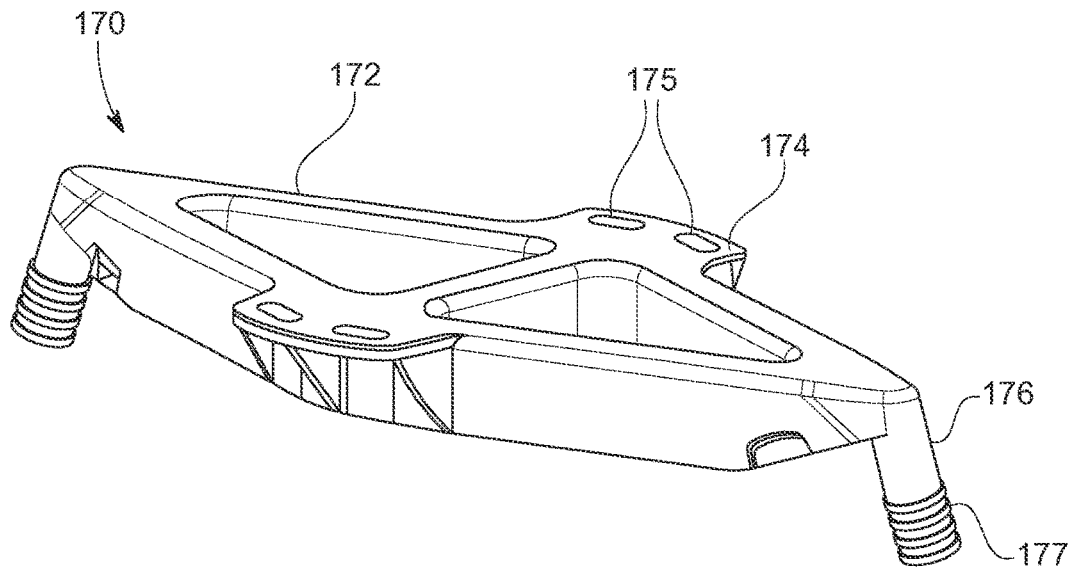
FIG. 6A is a top view of a tracker motor support according to further embodiments of the disclosure.
Figure 6B:
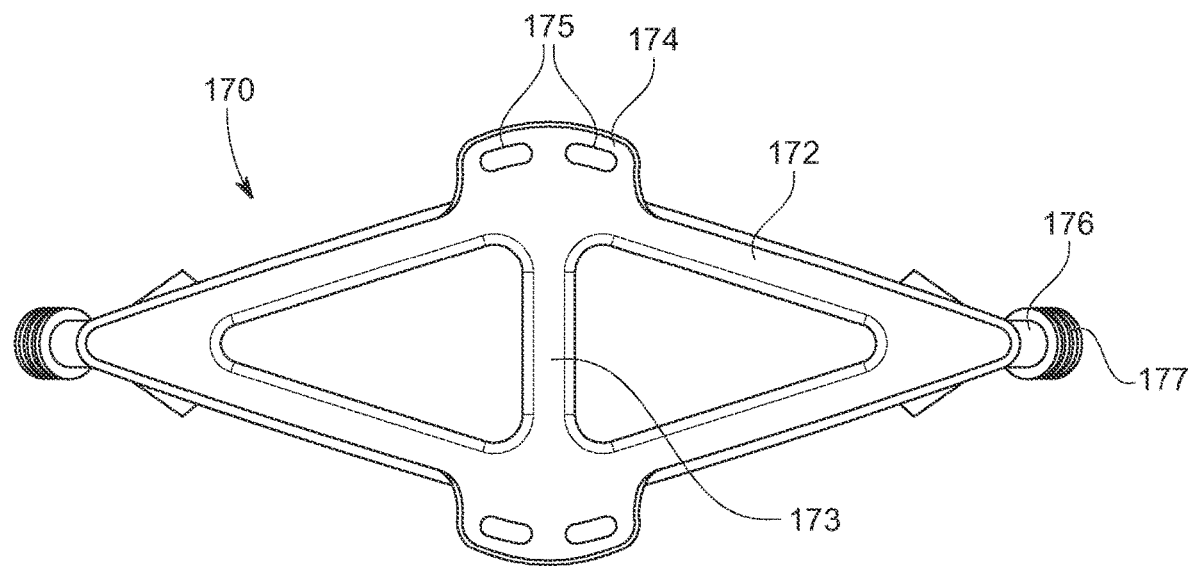
FIG. 6B is a side view of the tracker motor support of FIG. 6A.
Figure 6C:
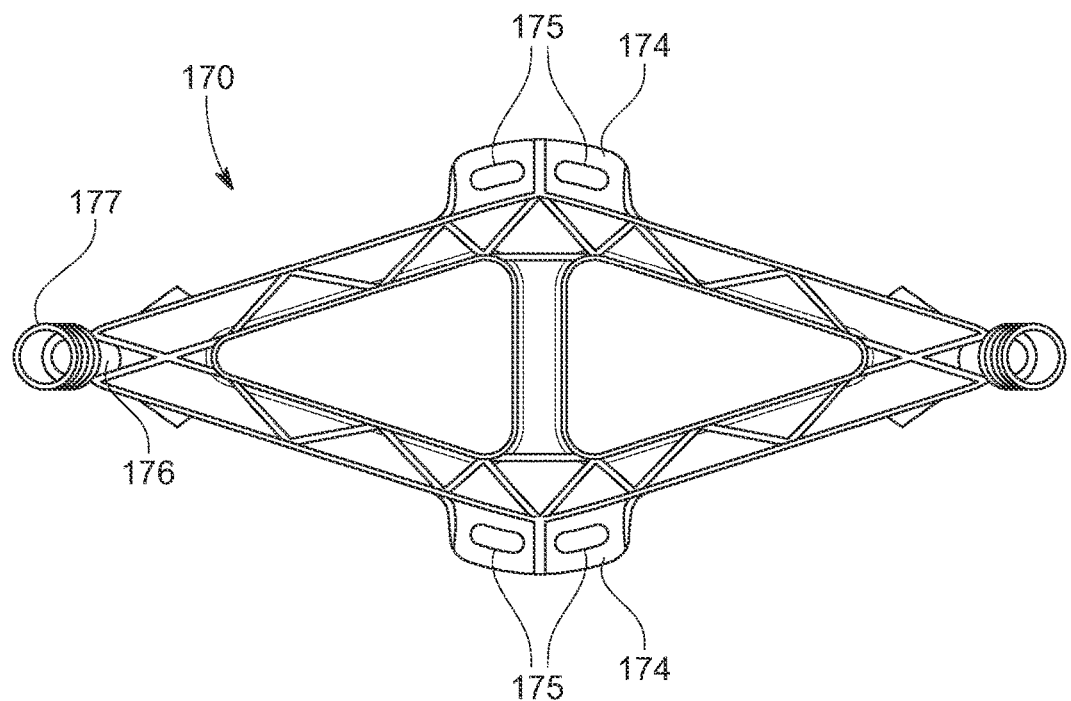
FIG. 6C is lower view of the tracker motor support of FIG. 6A.
Figure 7A:
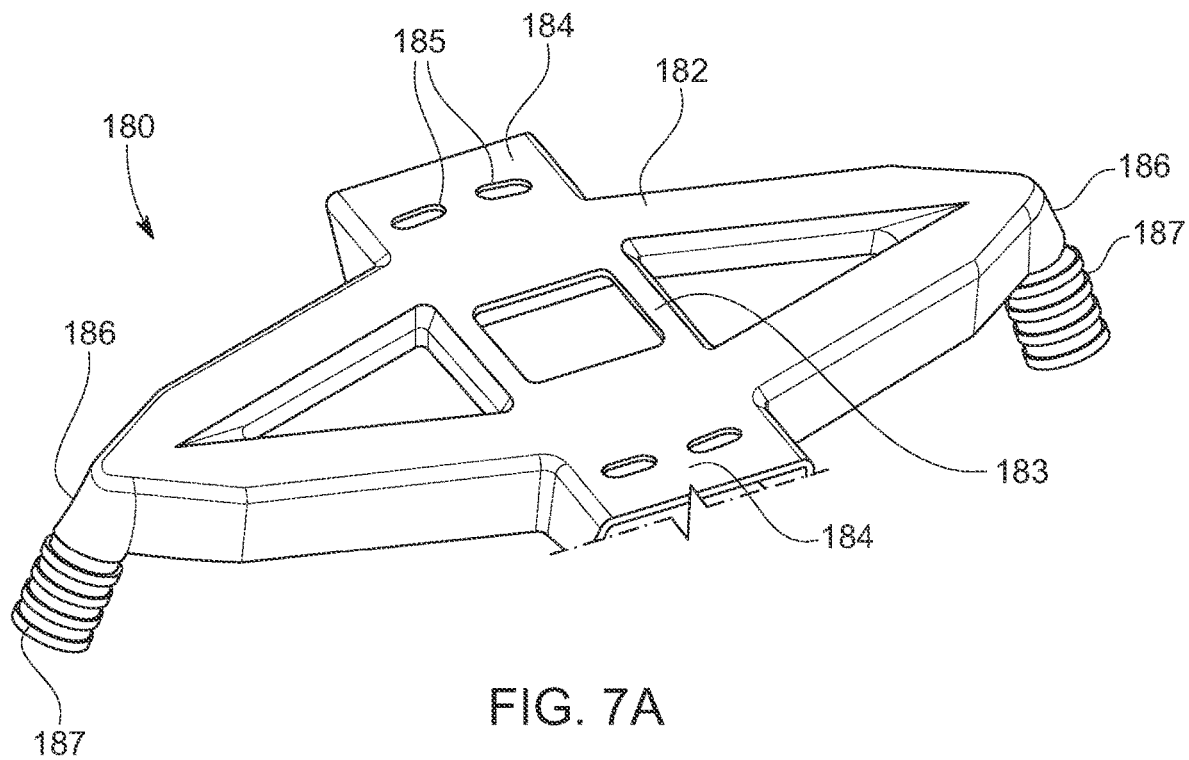
FIG. 7A is an upper perspective view of a tracker motor support according to various other embodiments of the disclosure.
Figure 7B:
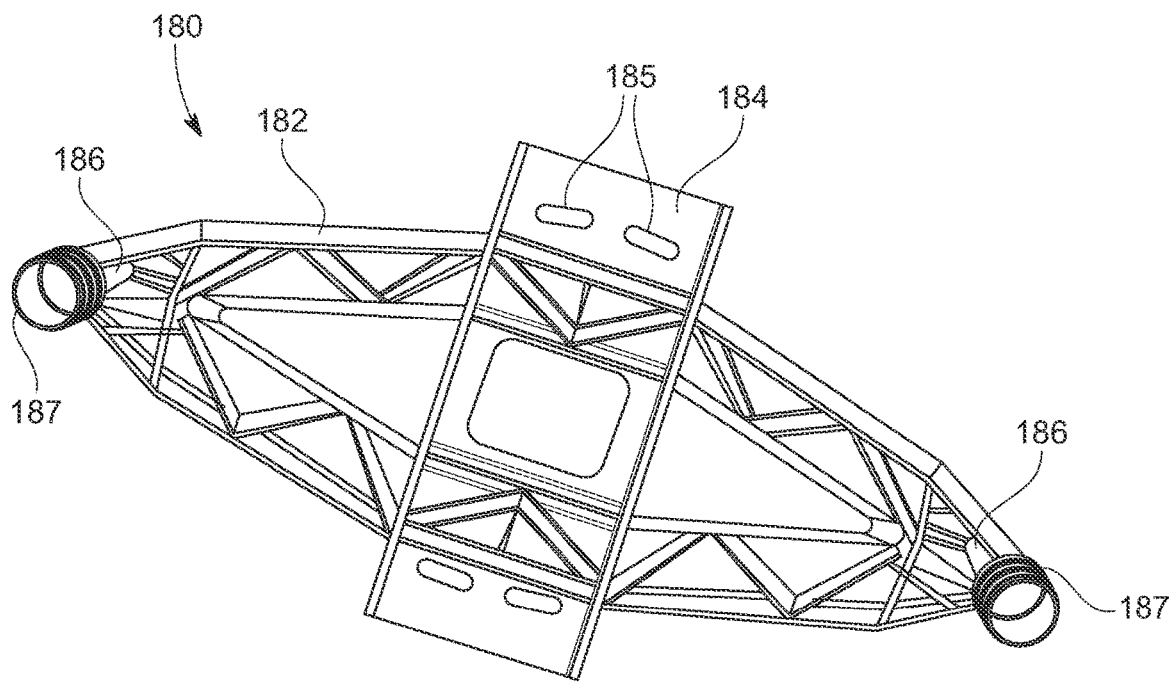
FIG. 7B is a lower perspective view of the tracker motor support of FIG. 7A.

Turning to FIGS. 5A-C, another motor support truss cap 160 according to various embodiments; FIGS. 5D and E show motor support truss cap 160 from above and below with ATI motor assembly 50 attached. Motor support truss cap 160 include the same features as other motor support truss caps 120, 130, and 140 including main body portion 162 with central bridge portion 163 and motor support mounts 164 with slots 165. Opposing ends of the main body portion 162 terminate in connecting portions 166 with crimp couplings 167. Similarly, FIGS. 6A, 6B, and 6B show upper perspective, top and bottom views respectively of tracker motor support 170. Motor support 170 is a slightly different one-piece casting design that consisting of the same basic components of main body 172, central bridge portion 173 with distal mounting platforms 174 and slot 175. Main body 172 terminates in connecting portions 176 with crimp connectors 177. FIGS. 7A and 7B show upper and lower perspective views respectively of additional truss cap motor support 180. Truss cap 180 may be cold formed or stamped with welding as necessary but is otherwise the same as other unitary truss cap motor supports with main body 182, central bridge portion 183, mounting platforms 184 with slots 185 and distal connecting portions 186 with crimp connectors 187.

Due to variations in elevation across the array, misalignment of driven screw anchors from their intended axes, and different loads at different locations on the array, it may be desirable to use different leg spacing and/or different truss cap elevations at different points on the array. Because truss caps 120, 130, 140, 160, 170 and 180 are unitary, they do not provide adjustment in the East-West direction. That is, the distance between opposing connecting portions is not adjustable. In some cases, this may require post driving adjustment of driven truss legs, or in the worst case, remove and replacement. In order to prevent these undesirable outcomes, the inventors of this disclosure have developed a two-piece motor support truss cap that can be adjusted to change the distance between connecting portions at each end of the two-piece assembly. The truss cap according to these embodiments is shown, for example, in FIGS. 9A, 9B, 10 and 11.

Figure 9A:
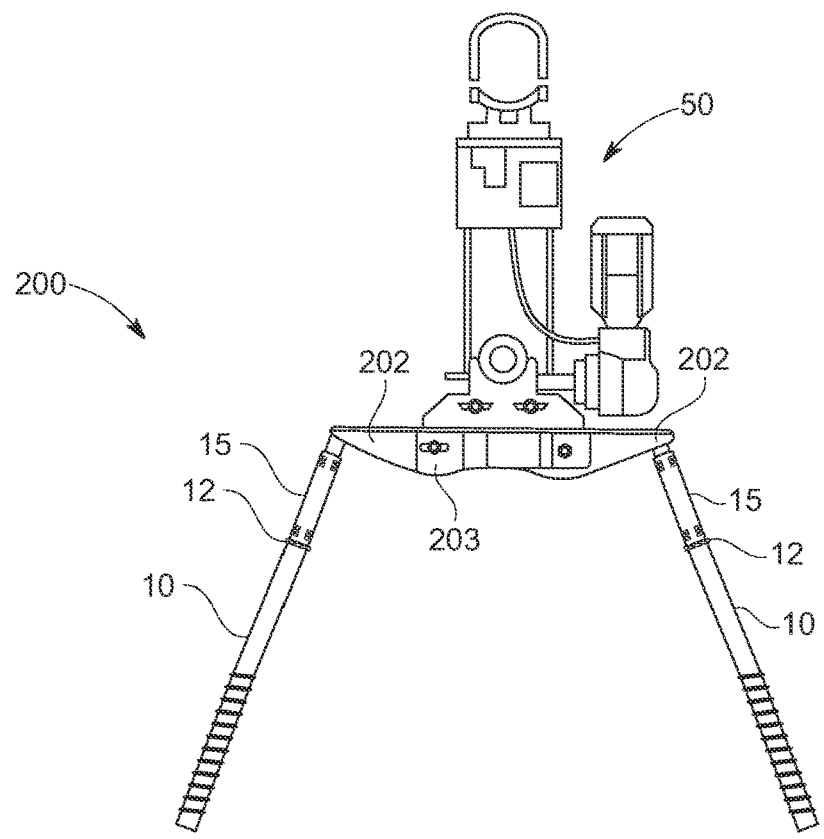
FIGS. 9A and 9B are front view of a truss foundation and tracker motor support with a motor component according to still further embodiments of the invention.
Figure 9B:
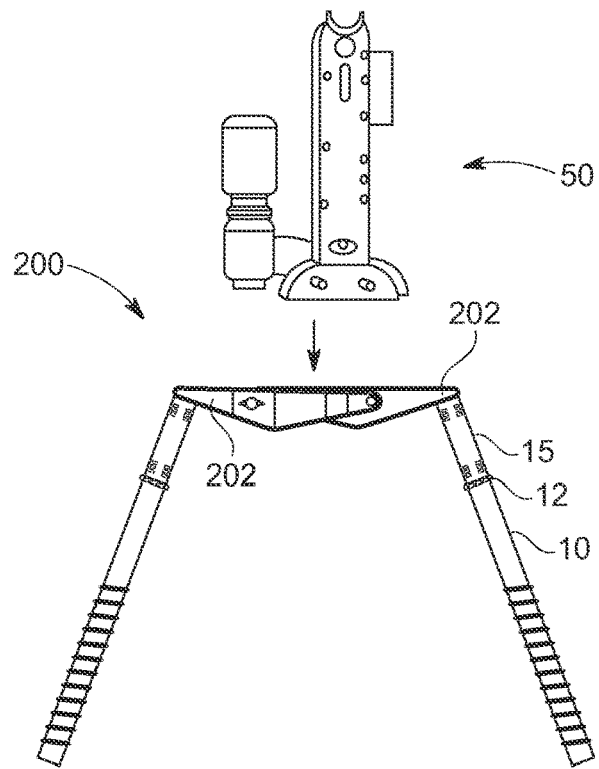
Figure 10:
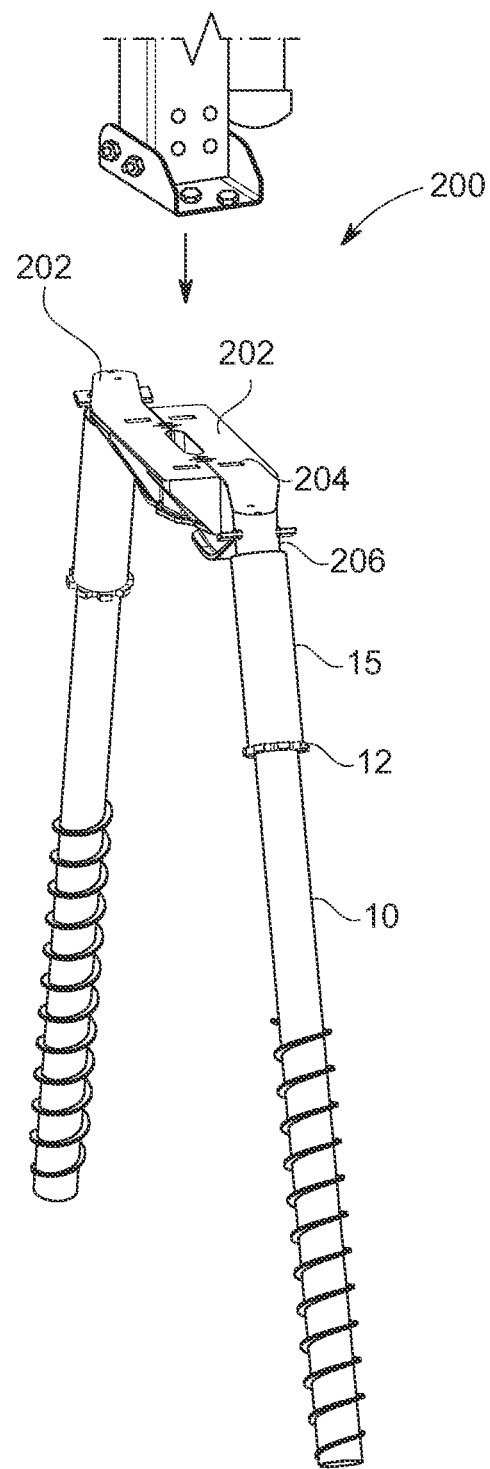
FIG. 10 is a side view of the truss foundation and tracker motor support shown in FIGS. 9A and 9B.
Figure 11:
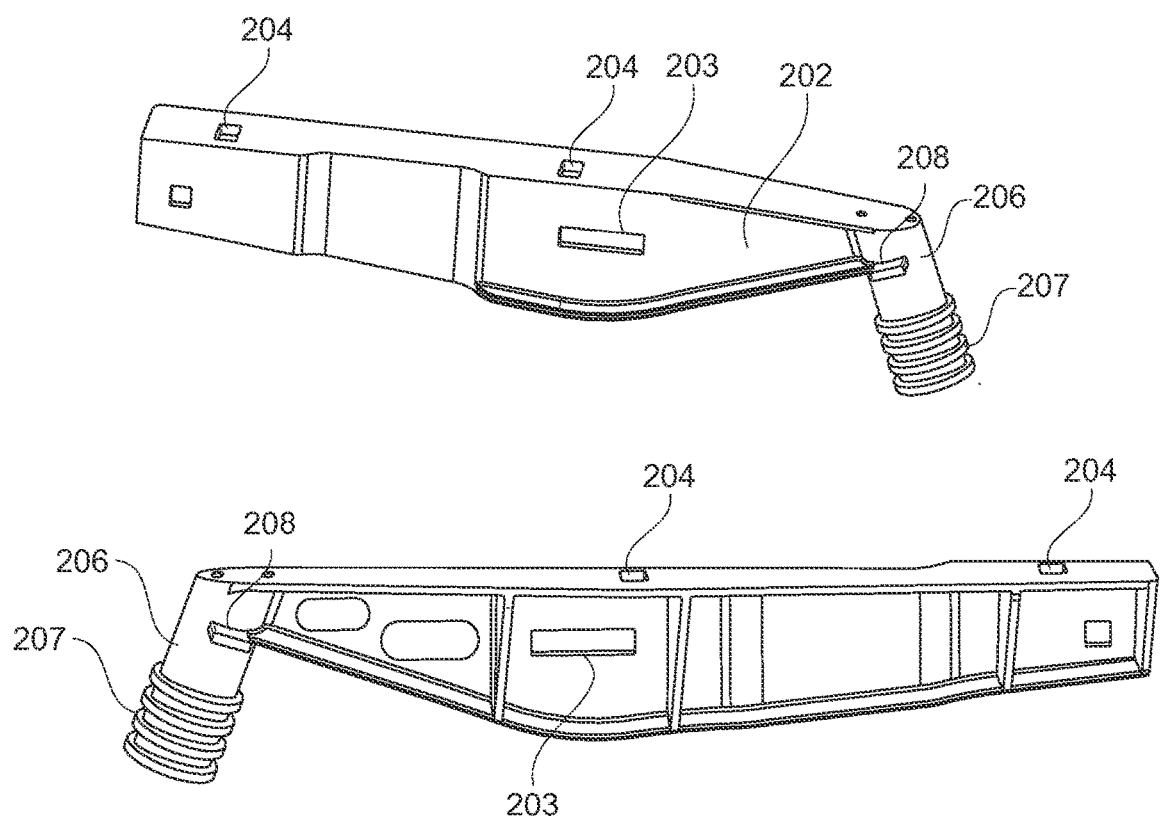
FIG. 11 is a partially exploded view of the tracker motor support for truss foundations shown in FIGS. 9A and 9B.

Turning to FIGS. 9A and 9B, these figures are front views of a truss foundation with motor support truss cap 200 according to various embodiments of the disclosure and supporting ATI motor assembly 50. FIG. 10 shows a side view of a truss foundation with motor support truss cap 200 and FIG. 11 is a partially exploded view of motor support truss cap 200. Starting with 9A, 9B and 10, the truss foundation using motor support truss cap 200 is assembled in the same manner as other truss cap disclosed and shown herein. A pair of adjacent screw anchors 10 are driven into the ground to straddle an intended North-South line of the tracker row. Sections 202 of truss cap 200 are bolted loosely together to and placed in a jig, holder, or other structure on the mast of the screw anchor driving machine at the correct height and orientation above the driven screw anchors 10 to achieve alignment with other trusses in the same row. Upper leg sections 15 are sleeved up over crimp couplings 207 of connecting portions 204 at the distal end of each truss cap half 202 and then down onto driving coupler 12 of one of the driven screw anchors 10. A crimping device is then used deform the portions of the upper leg that cover crimp couplings 207 and the driver couplers 12. As shown in these figures, an alignment tab such as tabs 208 may be oriented on connecting portions 206 to be parallel to the grooves in couplings 207. In various embodiments, the crimping device will have a guide that receives one of tabs 208 during a crimping operation to insurance that the teeth on the directed are oriented directly over the channels in crimp coupler 207 and that they crimper and crimp coupler 207 are axially aligned.

Once upper leg crimping is complete, fasteners passing through slots 203 on truss cap 203 are tightened to preserve the spacing of the truss cap. As shown in FIG. 11, in various embodiments, the two halves of truss cap 202 may be identical to minimize part count. The two portions will fit together so that they are slidably adjustable to increase or decrease the distance between opposing connecting portions 206 as needed to accommodate different distances between the legs. The mounting bracket for the ATI motor assembly that get attached to the top of truss cap 200 via mounting holes 204 also has slots that will compensate for any misalignment between adjacent holes 204 of the two different halves as truss cap 202 is adjusted to have a wider or narrower stance.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss foundation system for a solar tracker motor comprising:
   a pair of truss legs; and
   an adapter for joining a pair of truss legs, the adapter comprising:
     a first member; and
     a second member, wherein the first and second members each terminate in a connecting portion and are adapted to be slidable connected to one another so that the distance between opposing connecting portions is adjustable, wherein each connecting portion is adapted to be received within an end of one of the truss legs and comprises a crimp connector having a plurality of grooves formed in an outer circumference thereof and an alignment tab substantially parallel to the grooves to align a crimper joining the connection portion to one of the truss legs over the plurality of grooves.

2. The truss foundation system according to claim 1, wherein when slidably connected, the first and second members provide a mounting surface for receiving a tracker drive component.

3. The truss foundation system according to claim 2, wherein the tracker drive component is selected from the group consisting of a drive motor and a center structure.

4. The truss foundation system according to claim 2, wherein an axis through each connecting portion intersects at a common point over the mounting surface.

5. The truss foundation system according to claim 1, wherein the first and second members are adapted to receive at least one fastener passing through them so that they remain interconnected while a distance between their respective connecting portions is adjusted.

6. A tracker motor support comprising:
an elongated main body;
a bridge portion proximate to a middle of the elongated main body;
a pair of connecting portions at distal ends of the elongated main body portion extending away from the elongated body, wherein each connecting portion is adapted to be received in an open end of a truss leg and comprises a crimp connector having a plurality of grooves formed in an outer circumference thereof and an alignment tab substantially parallel to the grooves to align a crimper joining the connection portion to one of the truss legs.

7. The tracker motor support according to claim 6, wherein the bridge portion comprises a mounting surface with a plurality of through holes to support a tracker drive component.

8. The tracker motor support according to claim 7, wherein the tracker drive component is selected from the group consisting of a drive motor and a center structure.

9. A system comprising:
a pair of adjacent truss legs extending above and below ground; and
an adapter joining the pair of adjacent truss legs, the adapter having a bridge portion positioned between a pair of connecting portions, each connecting portion received in one of the adjacent truss legs of the pair, wherein the connecting portions each comprise a crimp connector having a plurality of grooves formed in an outer circumference thereof and an alignment tab on the adapter proximate to each connecting portion that is substantially parallel to the groves on the connecting portion to align a crimper joining the connecting portion to one of the truss legs; and
a tracker drive component attached to the adapter.

10. The system according to claim 9, wherein the adapter comprises first and second elongated members that terminate at one end in one of the connecting portions and that are adapted to be slidably fit together so that distance between their respective connecting portions may be adjusted.

11. The system according to claim 9, wherein the adapter comprises a mounting surface with a plurality of through holes to support the tracker drive component.

12. The system according to claim 9, wherein the tracker drive component is selected from the group consisting of a drive motor and a center structure.

* * * * *